United States Patent
Wada et al.

(10) Patent No.: US 6,858,321 B2
(45) Date of Patent: Feb. 22, 2005

(54) CORROSION RESISTANT MEMBER

(75) Inventors: Nobuaki Wada, Anjo (JP); Yasuhiro Nagaya, Hazu-gun (JP); Mitsuhiro Ito, Nagoya (JP); Naruhisa Kamiya, Toyohashi (JP); Makoto Sakakibara, Hazu-gun (JP)

(73) Assignee: Yuken Industry Co., Ltd., Aichi (JP)

( * ) Notice: Subject to any disclaimer, the term of this patent is extended or adjusted under 35 U.S.C. 154(b) by 11 days.

(21) Appl. No.: 10/252,730

(22) Filed: Sep. 23, 2002

(65) Prior Publication Data

US 2003/0190492 A1 Oct. 9, 2003

(30) Foreign Application Priority Data

Apr. 5, 2002 (JP) ........................................ 2002-104054

(51) Int. Cl.[7] ........................ B32B 15/04; B32B 15/18; B32B 31/00
(52) U.S. Cl. ...................... 428/632; 428/658; 428/659; 428/666; 428/341
(58) Field of Search ................................ 428/632, 658, 428/659, 630, 666, 341, 432, 450; 296/900; 427/126.1

(56) References Cited

U.S. PATENT DOCUMENTS

| 4,148,670 A | | 4/1979 | Kelly .................... 148/6.15 R |
| 4,804,587 A | * | 2/1989 | Takeuchi et al. ............ 428/623 |
| 6,096,140 A | * | 8/2000 | Susa et al. .................. 148/253 |
| 2003/0121570 A1 | * | 7/2003 | Oshima et al. ............. 148/267 |

FOREIGN PATENT DOCUMENTS

| JP | 52-131937 | | 11/1977 |
| JP | 05-287555 | * | 11/1993 |
| JP | 07-126859 | | 5/1995 |
| JP | 08-269732 | * | 10/1996 |
| JP | 10-183364 | | 7/1998 |
| JP | 2000-234177 | * | 8/2000 |

* cited by examiner

Primary Examiner—Michael La Villa
(74) Attorney, Agent, or Firm—Webb Ziesenheim Logsdon Orkin & Hanson, P.C.

(57) ABSTRACT

A corrosion resistant member has a chemical conversion treatment film with a two-layer structure formed atop a metal substrate plated with zinc or zinc alloy plating. The two-layer structure comprises a lower layer containing Cr formed on the surface of the plating and an upper layer containing $SiO_2$.

13 Claims, 3 Drawing Sheets (Example 4)

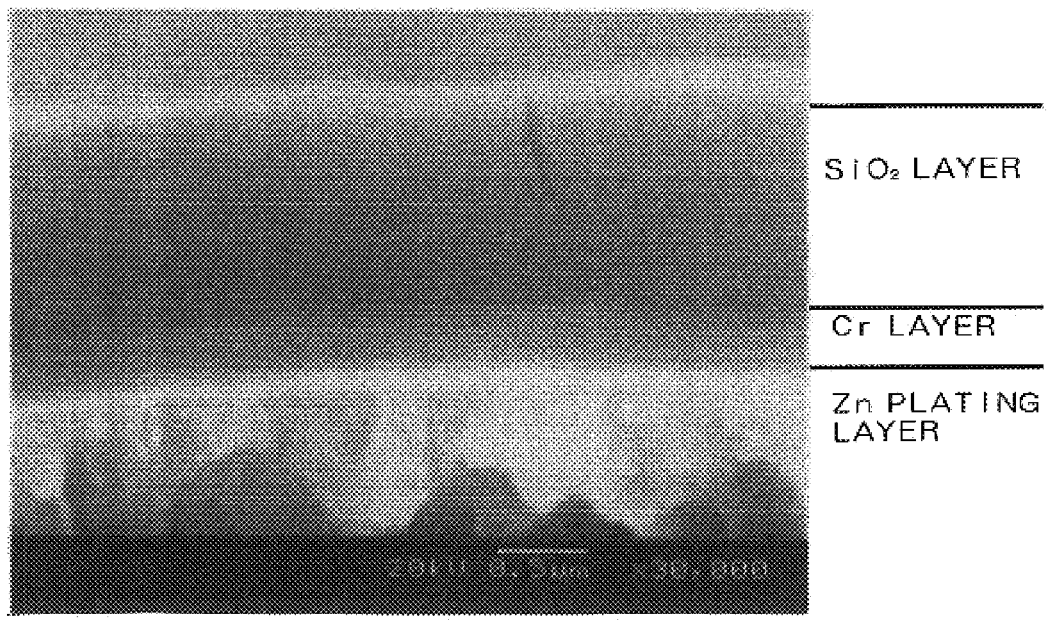
Fig. 4a (Example 4)
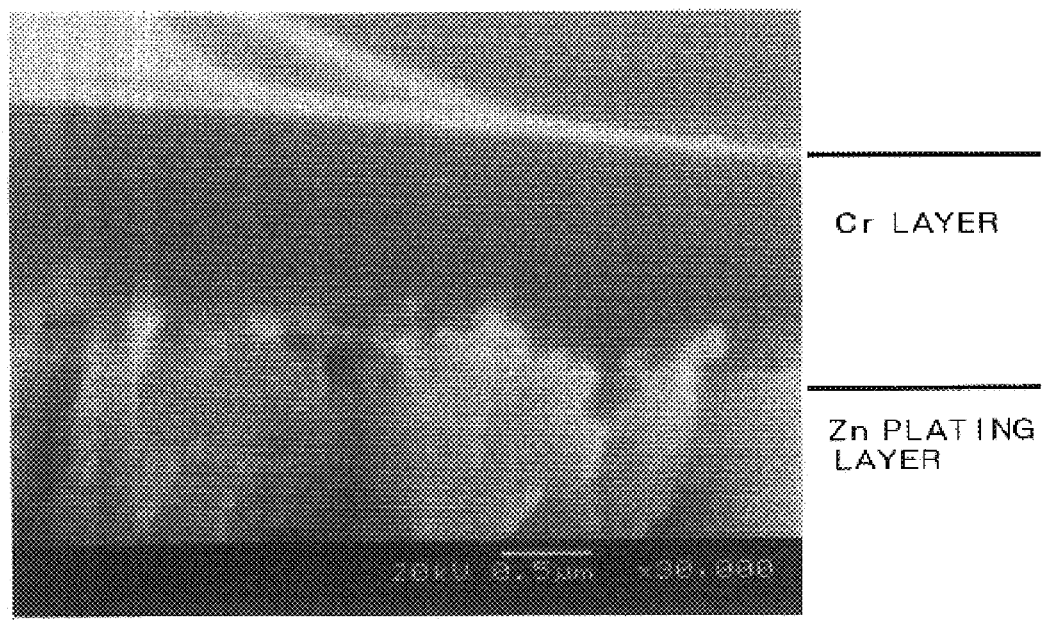
Fig. 4b (Comparative 8)

CORROSION RESISTANT MEMBER

BACKGROUND OF THE INVENTION

1. Field of the Invention

This invention relates to a zinc- or a zinc alloy-plated member having chemical conversion coatings which do not contain hexavalent chromium or fluorides, which are harmful to the human body and to the environment. It also relates to automotive parts, electronic or electrical equipment parts, or building construction parts, which are made from such a corrosion resistant member.

2. Description of the Related Art

Zinc plating and zinc alloy plating are widely used to prevent corrosion of steels and other metals. In this specification, zinc plating and zinc alloy plating will be collectively referred to as "zinc-based plating" and a zinc-plated member and a zinc alloy-plated member will be collectively referred to merely as a "zinc-plated member".

A zinc-plated member exhibits corrosion resistance utilizing the sacrificial corrosion preventing ability (preferential dissolving) of zinc. Therefore, in an unprotected state, the corrosion resistance of zinc-based plating decreases in a relatively short period of time. Accordingly, in order to increase the corrosion resistance of zinc-based plating, chemical conversion treatment is usually carried out after plating to form a protective film atop the plating. Zinc phosphate treatment and chromate treatment are the chemical conversion treatment most commonly utilized for this purpose.

Zinc phosphate treatment is carried out under heating using an aqueous solution containing phosphoric acid ions and zinc ions. The solution also contains fluorine ions or fluoride complex ions as an etching agent. The zinc phosphate film obtained has surface irregularities, so it increases the adhesion of paint or other coating applied atop the film. A zinc phosphate film is used as primer coating for painting. When painting is not carried out, a zinc phosphate film gives the zinc-plated member a poor appearance, and the effect of the plating on improving corrosion resistance is small. Furthermore, the fluorine ions or fluoride complex ions as an etching agent are severely corrosive, so there are strict regulations concerning how it can be discarded.

Chromate treatment is carried out using an aqueous solution of chromic acid anhydride. This aqueous solution may further contain one or more suitable auxiliary components selected from various mineral acids ($H_2SO_4$, $HNO_3$, HF, $H_2SiF_6$, $H_3PO_4$, HCl, and the like), colloidal silica, water soluble resins, and the like. The color of the resulting chromate film varies in accordance with the type of mineral acid which is added. In bright chromate treatment, the color of the film varies from colorless to light yellow. In colored chromate treatment, other colors, such as black or green, are possible.

Chromate treatment is generally classified as coating type treatment (in which washing is not carried out after treatment), reaction type treatment (in which washing is carried out after treatment), and electrolysis type treatment. In each case, the reduction of $Cr^{6+}$ to $Cr^{3+}$ (in coating type and reaction type treatment, the reduction is carried out by dissolving zinc in the plating surface, and in electrolysis type treatment, the reduction is carried out by electrolytic reduction) is the first step in film formation. The resulting chromate film has a complicated composition, but it is thought that the composition is approximately a chromium chromate ($mCr_2O_3 \cdot nCrO_3 \cdot xH_2O$). Namely, it is a mixture of hexavalent chromium and trivalent chromium, so it necessarily contains hexavalent chromium.

Another type of chromate film is a chromium phosphate type chromate film in which a mineral acid in the form of phosphoric acid is added to a chromic acid aqueous solution, and $CrPO_4$ is introduced into the film. In this case, chromium chromate is also present, so the film contains hexavalent chromium.

The complex hexavalent chromium in the chromate film is soluble, and if the hexavalent chromium dissolves, it is reduced to trivalent chromium and film formation takes place, so it imparts self-repairing properties to the chromate film. The self-repairing properties give a chromate film excellent corrosion resistance.

However, as is well known, hexavalent chromium is harmful to humans. Chromate treatment employing hexavalent chromium entails expensive treatment of waste liquid. In addition, when a material having a zinc-based plating which has undergone chromate treatment is discarded, hexavalent chromium dissolves from the chromate film, and the hexavalent chromium can cause environmental problems. For these reasons, there has come to be a desire for a chemical conversion treatment liquid which does not contain hexavalent chromium.

Some known examples of such chemical conversion treatment liquids which are free of hexavalent chromium are those disclosed in Japanese Published Unexamined Patent Application Hei 7-126859, Japanese Published Unexamined Patent Application Hei 10-183364, U.S. Pat. No. 4,148,670, and Japanese Published Unexamined Patent Application Sho 52-131937.

While it is true that these chemical conversion treatment liquids do not contain hexavalent chromium, but except for that disclosed in Japanese Published Unexamined Patent Application Hei 10-183364, each of the treatment liquids contains fluorides. Fluorides are strongly corrosive, and they have a harmful effect on human bones, so discarding of fluorides is strictly controlled, making their use troublesome.

A film which is formed by a conventional chemical conversion treatment liquid which uses trivalent chromium and is free of hexavalent chromium cannot adequately form a film and has poor corrosion resistance compared to a chromate film formed by reduction of hexavalent chromium to trivalent chromium. On the other hand, when a conventional chromate film relying on hexavalent chromium is heated to a high temperature, the hexavalent chromium in the film becomes insoluble, so the self-repairing properties due to dissolving of hexavalent chromium decrease, and the corrosion resistance of the film when heated enormously decreases.

SUMMARY OF THE INVENTION

An object of the present invention is to provide a protective film free of hexavalent chromium or fluorides, which can enormously improve the corrosion resistance of zinc plating to the same level or above that of conventional chromate film, and which does not undergo a decrease in corrosion resistance even when heated to a high temperature, i.e., which has excellent high temperature corrosion resistance.

Another object of the present invention is to provide a method of producing such a protective film free of hexavalent chromium or fluorides as in the above.

In Japanese Published Unexamined Patent Application 2000-234177, the present inventors proposed a chemical conversion treatment liquid for solving the above-described problems of the prior art and disclosed automotive parts exhibiting excellent corrosion resistance.

Accordingly, a still another object of the present invention is to provide a zinc-plated member having a chemical conversion film which is more practical and has an even better corrosion resistance and is cheaper than the chemical conversion treatment film formed by the chemical conversion treatment liquid disclosed in Japanese Published Unexamined Patent Application 2000-234177.

A still further object is to provide automotive parts, electronic or electrical equipment parts, construction parts, or the like made from this zinc-plated member.

The present inventors studied various combinations of trivalent chromium compounds with various compounds of titanium, cobalt, tungsten, aluminum, and silicon, and they found by chance that a combination of a trivalent chromium compound and a silicon compound resulted in a chemical conversion film having a two-layer structure and exhibiting excellent corrosion resistance.

The present inventors found that if chemical conversion treatment of a zinc-plated member is carried out in one step under controlled conditions using an aqueous solution containing a trivalent chromium compound and further containing a silicon compound, a chemical conversion film having a two-layer structure comprising a lower layer including Cr and an upper layer atop it including $SiO_2$ is obtained, so even with a thin chemical conversion film, it is possible to obtain superior corrosion resistance compared to a conventional chromate film. This film does not contain hexavalent chromium, so there is no decrease in its corrosion resistance when it is heated. In this specification, for convenience, the above-described chemical conversion treatment to be carried out in one step will be sometimes referred to merely as chromate treatment, and a chemical conversion film formed by the treatment will be sometimes referred to merely as a chromate film.

According to one aspect of the present invention, a corrosion resistant member comprises a metal substrate, a zinc-based plating layer formed on the substrate, and a chemical conversion film of a two-layered structure comprising a lower layer containing Cr and particularly Cr (III) formed atop the plating and an upper layer containing $SiO_2$ atop the lower layer.

In an embodiment of the present invention, the lower layer may contain one or more substance selected from titanium, cobalt, tungsten, and aluminum.

After the formation of the two-layer chemical conversion film having an upper layer and a lower layer integrated with each other in single-step treatment, an organic and/or inorganic coating may be applied atop the chemical conversion film, if desired, to further increase the corrosion resistance of the member.

By providing such a double-layered chemical conversion film in accordance with the present invention, such excellent practical effects are obtained that excellent corrosion resistance is exhibited in steel parts for automobiles and particularly in unpainted automobile parts, and that it can contribute to an increase in the number of guaranteed years against rusting which is strongly desired today. A decrease in vehicle costs, an increase in vehicle safety, and the like are also achieved. Similarly, when the member is used in electronic or electrical equipment parts or in construction parts, the service life is lengthened, and safety is increased.

BRIEF EXPLANATION OF THE DRAWINGS

FIG. 4a is an electron micrograph of a two-layer chromate film according to the present invention, and FIG. 4b is an electron photomicrograph of a conventional example.

DESCRIPTION OF PREFERRED EMBODIMENTS

Figure 1:
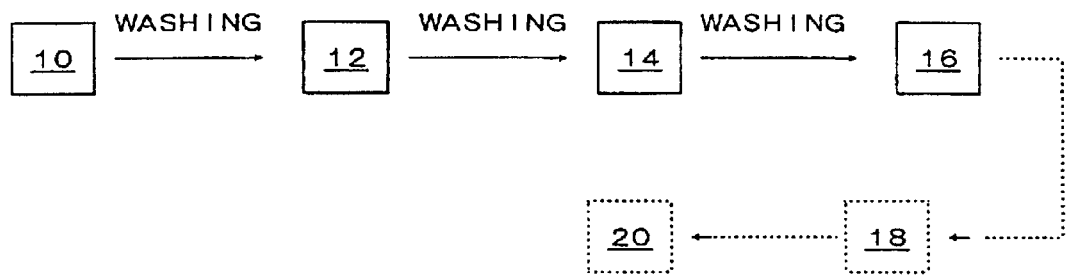
FIG. 1 is a process diagram showing an example of a treatment process for forming a two-layer chromate film according to the present invention.

An object to be treated with a chemical conversion treatment liquid according to the present invention is a member plated with zinc or a zinc alloy, i.e., a zinc-plated member. Some examples of types of zinc-based plating are electrogalvanized plating, hot dipped zinc plating, alloyed hot dipped zinc plating (such as zinc-aluminum alloy plating), and zinc alloy electroplating (such as zinc-nickel alloy plating). The substrate to be plated is normally made of steel, but it may be made of other metals. There is no restriction on the shape of the substrate to be plated. For example, it may be in the form of primary formed items such as plates, tubes, or profiles, or it may be in the form of secondary formed items which have undergone secondary working such as shaping, punching, or machining. For example, the substrate can be a small item such as a nut or bolt.

A corrosion resistant member according to the present invention is particularly suitable for use as steel parts for automobiles, and more specifically as steel parts for automobiles which are used without being painted. Even after being heated to a high temperature to simulate the environment of use of an automobile, a corrosion resistant member according to the present invention can exhibit far greater corrosion resistance than expected. Therefore, when a corrosion resistant member according to the present invention is used in automotive parts, a significant increase in the guaranteed life against rusting, a decrease in vehicle costs, and an increase in vehicle safety are possible.

Some examples of automotive parts for which a corrosion resistant member according to the present invention can be used are small steel parts such as bolts, nuts, screws, springs, clips (used for securing various parts to inlets or flow passages for oil, fuel, and other fluids), and large steel parts such as motor casing, engine parts (brackets for installing equipment on an engine, pipes, etc.), and various types of panels.

More specific examples of small parts on the periphery of an engine are (1) springs, bolts, nuts, levers, washers, shafts, clips, brackets, and the like provided on engine control valves and levers, (2) pipes, brackets, bolts, nuts, washers, covers, and the like, provided on fuel injection systems, fuel filters, fuel pumps, oil pumps, and the like, (3) pipes, brackets, bolts, nuts, washers, covers, and the like, provided on vacuum pipes, emissions systems, air compressor assemblies, turbo charger systems, and the like. Presently, small parts of this type are used after being subjected to chromate treatment without being painted.

Other examples of steel automotive parts for which the present invention can be employed includes hinges, locks, and strikers for automobile doors, fasteners for assembly of automotive bodies, motor cases, oil filter covers, fittings for securing hoods, suspension rods, and calipers for disc brakes.

Examples of parts for electronic or electrical equipment for which a corrosion resistant member according to the present invention can be used include all types of frames, brackets, fasteners, various parts used in magnetic fields, and various types of cases such as switch cases.

Examples of parts for use in construction include anchor bolts, staplers, fasteners, bolts, nuts, clamps, and various other types of construction hardware.

A chemical conversion film according to the present invention is effective whether applied on a plated substrate immediately after plating or whether applied on a plated substrate some time after plating has been carried out. However, from the standpoint of corrosion resistance, it is preferable to form the chemical conversion film on a substrate immediately after plating. An example of a process in which chemical conversion treatment is carried out immediately after plating (in this case, plating is carried out by electroplating) is shown in FIG. 1.

As shown in FIG. 1, after zinc-based plating is carried out at Stage 10, the plated substrate is first washed, then plating liquid adhering thereto is removed. In the case of hot dipped plating, washing is not necessary, but it is necessary to perform cooling to room temperature. Then, before performing chemical conversion treatment, if necessary, the plated substrate is treated with acid in Stage 12, and the surface of the plating is activated. When performing chemical conversion treatment on a plated substrate in an undried state immediately after electroplating (with washing having been performed without drying), the activity of the surface is fairly high, so it is not necessary to perform activation treatment with acid, but if activation treatment is carried out, an even better result is obtained. When drying has been carried out after electroplating or in the case of a substrate plated by hot dipping, the activity of the surface of the plating is not very high, so it is preferable to carry out activation treatment with an acid. When some time has passed after plating, for the same reasons, it is preferable to carry out activation treatment. Before doing so, conventional alkali degreasing treatment may be carried out.

The acid used for activation treatment is typically a mineral acid, such as nitric acid, sulfuric acid, or hydrochloric acid, with nitric acid being particularly preferred. The concentration of the acid is, in the case of concentrated nitric acid, for example, preferably an extremely dilute acid concentration of 0.5–5 ml/liter of concentrated nitric acid. The concentration is approximately the same for hydrochloric acid or sulfuric acid. The method is normally carried out by immersion, but spraying is also possible. It can also be carried out by electrolysis. A treatment temperature from room temperature to approximately 35° C. is normally suitable. After activation with an acid, washing is carried out, but drying is preferably not performed after washing, and the chemical conversion treatment according to the present invention is preferably immediately carried out in Stage 14.

In this manner, washing and drying are carried out after performing the below-described chemical conversion treatment according to the present invention.

The chemical conversion film is already formed during treatment, so it is sufficient for drying to completely remove water in Stage 16. Accordingly, drying at room temperature is possible, but in order to shorten the drying time, drying is preferably carried out at 50–90° C. and more preferably at 60–80° C.

A chemical conversion film, which is formed in this manner by one-step treatment using a single liquid, has a two-layered structure in which an upper and lower layer are integral with each other. As shown in the succeeding Examples, with respect to a zinc-based plating, it can impart a high level of corrosion resistance which is comparable to or surpasses that of a conventional hexavalent chromium-containing chromate film. Moreover, when it does not contain hexavalent chromium, even if it is heated to a high temperature of 200° C., for example, there is almost no decrease in corrosion resistance.

However, when it is used in an unpainted state, for example, and particularly in a maritime environment in which corrosion easily takes place, further increases in corrosion resistance are desired. In such cases, as shown by the dashed line in FIG. 1, an organic and/or inorganic coating can be applied to the chemical conversion film in Stage 18.

Some examples of a suitable coating liquid are an aqueous organic resin which can form an organic film, such as a water soluble or water dispersible acrylic, urethane, silicone, melamine, or other resin, or a silicon compound which forms an inorganic film, such as an alkali metal silicate (such as lithium silicate), colloidal silica (silica sol), or similar material. An organic material may be used together with an inorganic material to form an organic/inorganic composite coating. Such a coating material is usually water based, so it is not necessary to apply the coating to a dried material. Accordingly, when coating is performed, coating can be performed immediately after washing following chemical conversion treatment, and a drying step can be omitted.

The coating material can be applied using any conventional coating method. For example, immersion, spraying, roll coating, brushing, or the like can be employed. A suitable method can be selected based on the form of the zinc-plated member to be treated. There is no particular restriction on the coating thickness, but the thickness after drying is preferably in the range of 0.1–0.5 micrometers. Drying is performed in Stage 20 after coating, but when it is necessary to perform baking of the coating material, drying is carried out at a prescribed baking temperature.

The chemical conversion treatment liquid which is used in the present invention is an aqueous solution containing (A) trivalent chromium compounds and (B) silicon compounds.

According to a preferred mode of the present invention, such a chemical conversion treatment liquid does not contain hexavalent chromium, fluorides, or complex fluoride anions. Namely, not only is it free of hexavalent chromium, but it does not contain fluorides. In some cases, it may also be free of oxygen acid anions of phosphorus, i.e., of phosphoric acids.

As shown by the following formula, it is thought that trivalent chromium compounds (A) react with hydroxide ions which are formed by the dissolution of zinc to form a film of chromium hydroxide.

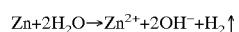

$Zn + 2H_2O \rightarrow Zn^{2+} + 2OH^- + H_2 \uparrow$

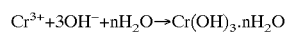

$Cr^{3+} + 3OH^- + nH_2O \rightarrow Cr(OH)_3 \cdot nH_2O$

Silicon compounds (B) also have the ability to form a film by themselves. This film forming mechanism is not completely understood, but it is thought to be as follows. Si ions ($Si^{2+}$) become silicon sulfate $[Si(SO_4) \cdot nH_2O]$ in the presence of sulfuric acid anions, for example, and this is not soluble in water, so it can form a film. In this manner, silicon compounds, such as silicates and silica sol can each form a siliceous (silicic) film.

Figure 2A:
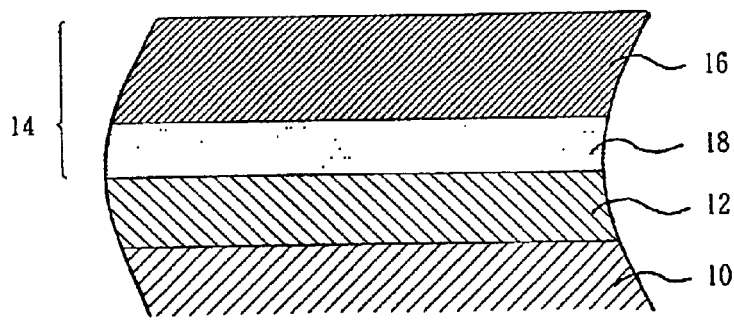
FIG. 2a is a schematic explanatory view of a two-layer chromate film according to the present invention.
Figure 2B:
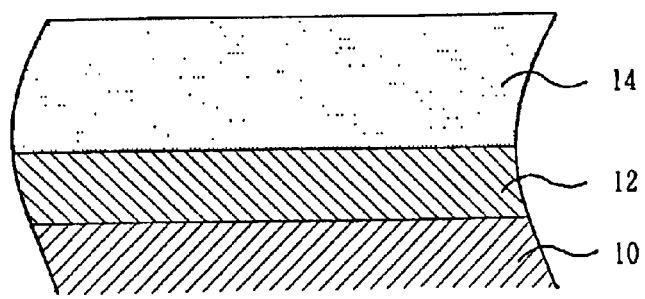
FIG. 2b is a schematic explanatory view of a conventional example.
Figure 3C:
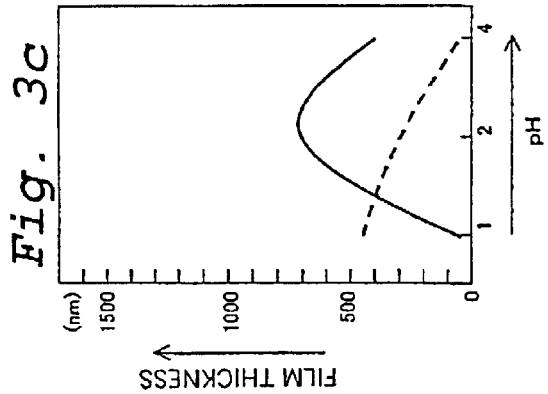
FIGS. 3a through 3e are graphs showing a general tendency of a change in the chemical conversion film when the concentration of Cr and Si, pH, temperature and time for chemical conversion are varied.
Figure 3B:
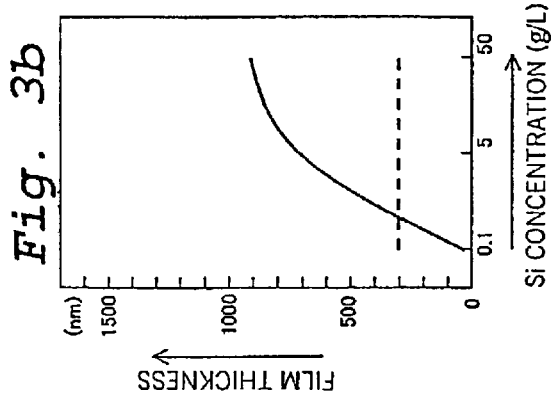
Figure 3E:
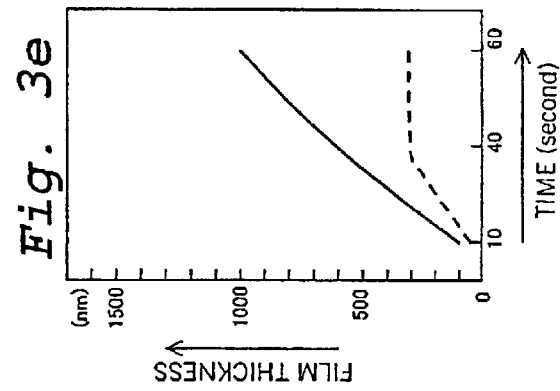
Figure 3A:
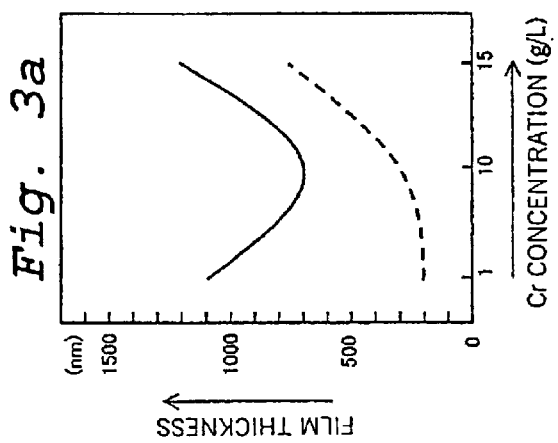
Figure 3D:
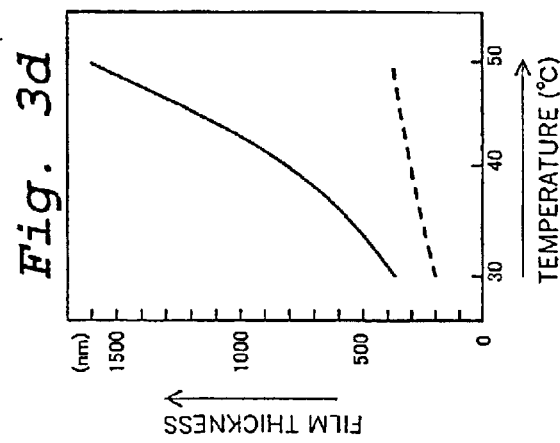

FIG. 2a is a schematic explanatory view of the film structure of a zinc-plated substrate having a two-layer film according to the present invention. FIG. 2b is a schematic explanatory view of the film structure of a conventional zinc-plated substrate disclosed in Japanese Published Unexamined Patent Application No. 2000-234177.

In FIGS. 2a and 2b, a metal substrate 10 such as a steel member has a zinc-based plating layer 12 provided on it, and a chromate film 14 according to the present invention is provided atop the plating layer 12. In the case of FIG. 2a, the chromate film 14 has a two-layer structure, with the upper layer 16 being 300–1500 nm thick and comprising a $SiO_2$-layer containing Si and oxygen (O) and with the lower layer 18 being 150–400 nm thick and comprising a Cr (III)-containing layer.

In one embodiment of the present invention, the lower layer 18 may also contain at least one substance selected from titanium, cobalt, tungsten, and aluminum. Preferably it contains titanium and/or cobalt.

In the conventional example shown by FIG. 2b, the chromate film 14 is a single layer, and it does not have a two-layer structure.

In another embodiment of the present invention, the lower layer which includes Cr and in particular Cr (III) may further include Zn.

According to the present invention, the amount of Cr and the amount of Si in the chromate film is considerably smaller than in the conventional example. In spite of this fact, the present invention can exhibit corrosion resistance which is the same or greater than that of the prior art. Therefore, an improvement in corrosion resistance like this can be said to be a synergistic effect of the two-layer structure.

The trivalent chromium compound (A) which is used in the present invention is a compound which supplies trivalent chromium ions ($Cr^{3+}$), i.e., it is a trivalent chromium salt. The silicon compound (B) can be silicic acid or a silicate. Either of these is soluble in water or an acid.

Some examples of compounds which are suitable for use in the present invention are listed below, but the present invention is not limited to these substances.

(A) trivalent chromium compounds: Chromium (III) nitrate, chromium (III) acetate, chromium (III) sulfate, chromium (III) chloride;

(B) silicon compounds: Silicic acid, lithium silicate, sodium silicate, silica sol (also referred to as colloidal silica)

A trivalent chromium compound (A) and at least one silicon compound (B) are together dissolved in water or an aqueous acid solution to prepare a chemical conversion treatment liquid according to the present invention. When the compounds which are used do not dissolve in water, an aqueous acid solution is used to dissolve them. A preferred acid is sulfuric acid or nitric acid.

The mechanism by which a chemical conversion treatment film according to the present invention takes on a two-layer structure has not been fully elucidated. According to the present invention, the film structure with one-liquid treatment becomes a two-layer structure.

A series of experiments for preparing a chemical conversion film in accordance with the present invention were carried out by varying Cr content, Si content, pH, temperature and treatment time using basic conditions:

Cr concentration: 10 g/L
Si concentration: 5 g/L
pH: 2.0
Bath Temperature: 40° C.
Treatment Time: 40 seconds.

Results are shown by graphs in FIGS. 3a through FIG. 3e, in which a general tendency of a change in film thickness of each of a chromium-containing lower layer (indicated in a dot line) and of a silica-containing upper layer (indicated in a real line) is shown with respect to an increase in the Cr concentration (FIG. 3a), the Si concentration (FIG. 3b), the pH (FIG. 3c), the treatment temperature (FIG. 3d), and the treatment time (FIG. 3e) of the chemical conversion liquid. In these experiments, when the thickness of a Cr-containing lower layer or a $SiO_2$-containing upper layer of the chemical conversion film was less than 100 nm, the two-layer structure could not be confirmed.

The concentration of each of the compounds in the treatment liquid, pH, the treatment temperature, and the treatment period of time are preferably as follows. If the values fall outside these ranges, it is difficult to obtain a two-layer structure.

pH: 1.0–4.0, preferably 1.2–2.4.
Temperature: 20–50° C., preferably 30–40° C.
Time: 10–60 seconds, preferably 30–60 seconds.
Trivalent Chromium Compound: 1–15 g/liter and preferably 1–10 g/liter as metallic Cr.
Silicon Compound: 0.1–50 g/liter as Si.

The bath composition used for chromate treatment according to the present invention is preferably as follows.

Trivalent chromium ions: 5–10 g/liter.
Sulfate ions: 0–30 g/liter.
Nitrate ions: 0–120 g/liter.
Colloidal silica: 5–20 g/liter.

If necessary, at least one of a titanium compound, a cobalt compound, a tungsten compound, and an aluminum compound may be added.

If the concentration of each of the compounds is too low, it is not possible to form a film having a thickness sufficient to improve corrosion resistance, or it takes too long to form a film, and it cannot be said to be practical. On the other hand, if the concentration is too high, a chromate treatment film with a two-layer structure is not formed, and the chemical conversion treatment liquid becomes unstable. If necessary, the pH can be adjusted by adding a pH conditioner (an acid, a base, or an ammonium salt such as ammonium nitrate). As with a conventional chromate-forming solution, a water soluble or water dispersible resin may be blended in the chemical conversion treatment liquid.

A treatment temperature in the range of 20–50° C. is suitable, preferably it is at most 50° C., and more preferably it is 20–45° C. (such as room temperature). A treatment time in the range of 10–60 seconds is suitable, and preferably it is 30–60 seconds. Treatment by immersion is simple, but it is also possible to employ spraying or other treatment methods. In the case of immersion, a suitable stirring method (such as vibration of the plating material, air stirring, or stirring with a mixer) is preferably employed.

The weight of the chemical conversion treatment film which is formed by treatment under the above conditions is generally in the range of 1–3 $mg/dm^2$ as Cr including trivalent and hexavalent Cr.

The amount of silica in the upper layer is in the range of 2.0–5.0 $mg/dm^2$ as $SiO_2$. When a metal compound such as titanium or cobalt compound is added, the total amount of the metal is 0.001–3 $mg/dm^2$.

A chemical conversion film according to the present invention may be formed without the addition of hexavalent chromium or fluorine and depending on the case without the addition of phosphorus. However, there are cases in which the presence of approximately at most 10 ppm of each of fluorine and phosphorus is unavoidable, so the presence of an unavoidable amount of this order is permissible, since such a small amount of each does not have any substantially harmful effect.

EXAMPLES

Examples 1–5 and Comparative Examples 1–10

An electroplated zinc plating layer (8 micrometers thick) was formed on a steel bolt using a commercial acid zinc plating liquid. After washing, the plating layer was immersed for 5 seconds in an aqueous acid solution containing 67.5 percent concentrated nitric acid 2 ml/liter at room temperature to carry out activation treatment. Then, after washing, the plating layer was immersed for 50 seconds in a chemical conversion treatment liquid at 40° C. comprising an aqueous solution containing the components listed below to carry out chemical conversion treatment. During treatment, the chemical conversion treatment liquid was stirred by air stirring. Then, washing was carried out, and the resulting film was dried by blowing warm air at 60° C. for 10 minutes. The weight of the chemical conversion film which was formed in this manner was 1–12 mg/dm$^2$ based on the total amount of Cr.

The treatment operations in this example are summarized in Table 1. Treatment Mode I is chemical conversion treatment according to the present invention.

The composition of the chemical conversion treatment liquid in the Examples and the Comparative Examples is shown in Table 2 and Table 3, respectively.

Comparative Examples 1–4 are ones in which a two-layer chemical conversion treatment film is formed by two-step treatment using two liquids.

Comparative Example 5 is an example of forming a chemical conversion treatment film with a single-layer structure of a trivalent chromate. Comparative Examples 6–9 are examples of forming a conventional hexavalent chromate film.

A salt spray test was carried out on the members which had been subjected to chemical conversion treatment in this manner, and the time (hr) until the formation of white rust 10% and red rust 5% was determined. The results and the composition of the chemical conversion treatment film are shown in Tables 4–6.

In Comparative Example 10 of Table 6, the chemical conversion treatment liquid was the same as for the present invention, but the amount of silica sol was small or the treatment temperature was low, so a film with a two-layer structure was not formed, and although it contained the same amount of chromium and silica as the two-layer structure of the present invention, it could not exhibit sufficient corrosion resistance.

FIG. 4a and FIG. 4b are electron micrographs showing the cross-sectional structure of a zinc-plated member which has been subjected to chemical conversion treatment obtained by Example 4 and Comparative Example 8. The magnification for each is 30,000. In the case of Example 4, the chemical conversion treatment film clearly has a two-layer structure of a layer containing Cr and a layer containing SiO$_2$, but in the case of Comparative Example 8, the chromate chemical conversion treatment film was a single layer of chromium.

TABLE 1

| | |
|---|---|
| Treatment Mode I | Zn plating → washing → nitric acid activation → washing → first treatment → washing → drying |
| Treatment Mode II | Zn plating → washing → nitric acid activation → washing → first treatment → washing → second treatment → drying |
| Treatment Mode III | Zn plating → washing → nitric acid activation → washing → first treatment → washing → drying → second treatment → drying |
| Treatment Mode IV | Zn plating → washing → nitric acid activation → washing → first treatment → drying |

In Treatment Modes II and IV, the amount of liquid remaining on the surface after the second treatment of Treatment Mode II and after the first treatment of Treatment Mode IV was 0.5–1.5 ml/dm$^2$.

The amount of coated components in the second treatment in Treatment Mode III was measured by weight.

The first treatment in Treatment Modes I, II, and III was chemical conversion treatment with air stirring.

TABLE 2

| | |
|---|---|
| Example 1 | chromium nitrate.9 water salt 40 g/l, 62.5% sulfuric acid 2 g/l, silica sol 10 g/l (particle diameter 10–20 nm) |
| Example 2 | chromium nitrate.9 water salt 40 g/l, 62.5% sulfuric acid 2 g/l, titanium (III) sulfate 2 g/l, silica sol 10 g/l (particle diameter 10–20 nm) |
| Example 3 | chromium nitrate.9 water salt 20 g/l, chromium sulfate 20 g/l, 62.5% sulfuric acid 2 g/l, titanium (III) sulfate 2 g/l, silica sol 10 g/l (particle diameter 10–20 nm) |
| Example 4 | chromium nitrate.9 water salt 40 g/l, 62.5% sulfuric acid 2 g/l, titanium (III) sulfate 2 g/l, cobalt nitrate.6 water salt 2 g/l, silica sol 10 g/l (particle diameter 10–20 nm) |
| Example 5 | chromium nitrate.9 water salt 20 g/l, chromium sulfate 20 g/l, 62.5% sulfuric acid 2 g/l, titanium (III) sulfate 2 g/l, cobalt nitrate.6 water salt 2 g/l, silica sol 10 g/l (particle diameter 10–20 nm) |

The treatment temperature was 40° C. and the treatment time was 50 seconds for the examples.

TABLE 3

| | |
|---|---|
| Comparative Example 1 | First treatment: same treatment as for Comparative Example 5 Second treatment: lithium silicate (SiO$_2$.Li$_2$O) 12.5 g/l, 20 seconds, 25° C. |
| Comparative Example 2 | First treatment: same treatment as for Comparative Example 5 Second treatment: silica sol 10 g/l, 20 seconds, 25° C. |
| Comparative Example 3 | First treatment: same treatment as for Comparative Example 5 Second treatment: water soluble acrylic.styrene resin emulsion (Saibinol UC404: 49% purity) 80 g/l lithium silicate (SiO$_2$.Li$_2$O) 12.5 g/l, 20 seconds, 25° C. |
| Comparative Example 4 | First treatment: same treatment as for Comparative Example 5 Second treatment: water soluble acrylic.styrene resin emulsion (Saibinol UC404: 49% purity) 80 g/l, 20 seconds, 25° C. silica sol 10 g/l |
| Comparative Example 5 | Same as the treatment for Example 1 except that silica sol was removed |
| Comparative Example 6 | Hexavalent chromate   Blue bright chromate   Metasu CB-70* 8 ml/l, 10 seconds, 25° C. |
| Comparative Example 7 | Hexavalent chromate   Yellow chromate   Metasu CY-6* 10 ml/l, 15 seconds, 25° C. |
| Comparative Example 8 | Hexavalent chromate   Green chromate   Metasu CG-38* 70 ml/l, 40 seconds, 25° C. |
| Comparative Example 9 | Hexavalent chromate   Black chromate   Metasu CK-210* 50 ml/l, CK-10B* 30 ml, 40 seconds, 25° C. |
| Comparative Example 10 | Chromium nitrate.9 water salt 12 g/l, silica sol 3 g/l 10 seconds, 25° C. |

*Trade name of Yuken Industry Co., Ltd., Saibinol UC404: trade name of Saiden Kagaku (KK)

TABLE 4

| Examples | Treatment Mode | First layer T. Cr (mg/dm$^2$) | First layer Ti (mg/dm$^2$) | First layer Co (mg/dm$^2$) | Second layer T. weight (mg/dm$^2$) | Second layer SiO$_2$ (mg/dm$^2$) | Resin component | White rust 10% (SST:Hr) | Red rust 5% (SST:Hr) |
|---|---|---|---|---|---|---|---|---|---|
| Example 1 | I | 1.0–2.0 | — | — | 2.0–4.0 | 2.0–4.0 | — | 504 | 718 |
| Example 2 | I | 1.0–2.0 | 0.1–0.5 | — | 2.0–4.0 | 2.0–4.0 | — | 504 | 768 |
| Example 3 | I | 1.0–2.0 | 0.1–0.5 | — | 2.0–3.0 | 2.0–3.0 | — | 480 | 768 |
| Example 4 | I | 1.0–2.0 | 0.1–0.5 | 0.001–0.1 | 2.5–5.0 | 2.5–5.0 | — | 720 | 1008 |
| Example 5 | I | 1.0–2.0 | 0.1–0.5 | 0.001–0.1 | 2.0–4.0 | 2.0–4.0 | — | 672 | 984 |
| Comparative Example 1 | II | 1.0–2.0 | — | — | 6.3–18.8 | 4.2–12.5 | — | 288 | 504 |
| Comparative Example 2 | II | 1.0–2.0 | — | — | 5.0–15.0 | 5.0–15.0 | — | 288 | 504 |
| Comparative Example 3 | III | 1.0–2.0 | — | — | 200–300 | 33–47 | 150–230 | 144 | 360 |
| Comparative Example 4 | III | 1.0–2.0 | — | — | 200–300 | 40–61 | 160–239 | 144 | 360 |

Note:
T. Cr: total amount of Cr
T. weight: total weight

TABLE 5

| Examples | Treatment Mode | Total Cr (mg/dm$^2$) | Hexavalent Cr (mg/dm$^2$) | White rust 10% (SST:Hr) | Red rust 5% (SST:Hr) | | |
|---|---|---|---|---|---|---|---|
| Example 1 | I | 1.0–2.0 | 0 | 504 | 718 | | |
| Comparative Example 5 | I | 1.0–2.0 | 0 | 8 | 72 | Single layer trivalent Cr, no second layer | |
| Comparative Example 6 | I | 1.0–1.5 | ~0.1 | 72 | 120 | Blue bright chromate | Hexavalent chromate |
| Comparative Example 7 | I | 3.0–4.0 | 0.6–0.8 | 168 | 456 | Yellow | |
| Comparative Example 8 | I | 8.0–10.0 | 0.9–1.1 | 360 | 504 | Green | |
| Comparative Example 9 | I | 10.0–12.0 | 0.6–0.8 | 192 | 240 | Black | |

TABLE 6

| Examples | Treatment Mode | Total Cr (mg/dm$^2$) | SiO$_2$ (mg/dm$^2$) | White rust 10% (SST:Hr) | Red rust 5% (SST:Hr) |
|---|---|---|---|---|---|
| Example 1 | I | 1.0–2.0 | 2.0–4.0 | 504 | 718 |
| Comparative Example 10 | IV | 0.5–1.0 | 0.6–1.5 | 16 | 72 |

As is clear from the results from Tables 4–6, (1) by forming a two-layer structure in single-step treatment, corrosion resistance is remarkably increased, (2) sufficient corrosion resistance can be obtained even if the Cr content of the chemical conversion treatment film is low, and (3) a two-layer structure is obtained, so the corrosion resistance is superior to a single-layer structure.

With a corrosion resistant member according to the present invention, in which hexavalent chromium which is harmful to the human body is not used, and phosphoric acid and fluorides which are harmful to the human body and to the environment are not added, a corrosion resistance with respect to a material with a zinc-based plating which is the same or superior to that of a conventional chromate film is obtained. Accordingly, environmental problems associated with chromate treatment can be avoided, and a plated material having a high performance the same or above that of the prior art can be provided, so the practical significance is extremely great. Steel parts for automobiles, parts for electronic or electrical equipment, and parts for construction according to the present invention not only have a greatly improved corrosion resistance, but they are unpainted, so they can greatly contribute to a decrease in manufacturing costs.

What is claimed is:

1. A corrosion resistant member comprising a metal substrate, a zinc-based plating formed on the substrate, and a chemical conversion film formed atop the plating in single-step treatment, and the chemical conversion film being of a two-layered structure free of hexavalent Cr comprising a lower layer containing Cr having a Cr content of approximately 1.0–3.0 mg/dm$^2$ and an upper layer containing SiO$_2$ having a SiO$_2$ content of approximately 2.0–5.0 mg/dm$^2$ atop the lower layer.

2. A corrosion resistant member as claimed in claim 1 wherein the lower layer further contains at least one of titanium, cobalt, tungsten, and aluminum.

3. A corrosion resistant member as claimed in claim 1 wherein the chemical conversion film is free of fluorides.

4. A corrosion resistant member as claimed in claim 1 wherein the chemical conversion film is free of phosphoric acids.

5. A corrosion resistant member as claimed in claim 1 wherein the chemical conversion film is formed in single-step treatment using a single liquid for a chemical conversion process.

6. An automotive part comprising the corrosion resistant member of claim 1.

7. A part for electronic or electrical equipment comprising the corrosion resistant member of claim 1.

8. A corrosion resistant member comprising a metal substrate, a zinc-based plating formed on the substrate, and a chemical conversion film formed atop the plating in single-step treatment, and the chemical conversion film being of a two-layered structure free of hexavalent Cr comprising a lower layer containing Cr having a Cr content of approximately 1.0–3.0 mg/dm$^2$ and at least one of titanium, cobalt, tungsten, and aluminum, and an upper layer containing $SiO_2$ having a $SiO_2$ content of approximately 2.0–5.0 mg/dm$^2$ atop the lower layer.

9. A corrosion resistant member as claimed in claim 8 wherein the chemical conversion film is free of fluorides.

10. A corrosion resistant member as claimed in claim 8 wherein the chemical conversion film is free of phosphoric acids.

11. A corrosion resistant member as claimed in claim 8 wherein the chemical conversion film is formed in single-step treatment using a single liquid for a chemical conversion process.

12. An automotive part comprising the corrosion resistant member of claim 8.

13. A part for electronic or electrical equipment comprising the corrosion resistant member of claim 8.

* * * * *